A. THOMA.
MACHINE FOR TREATING COATED CANVAS.
APPLICATION FILED MAY 15, 1905.
921,635.
Patented May 11, 1909.
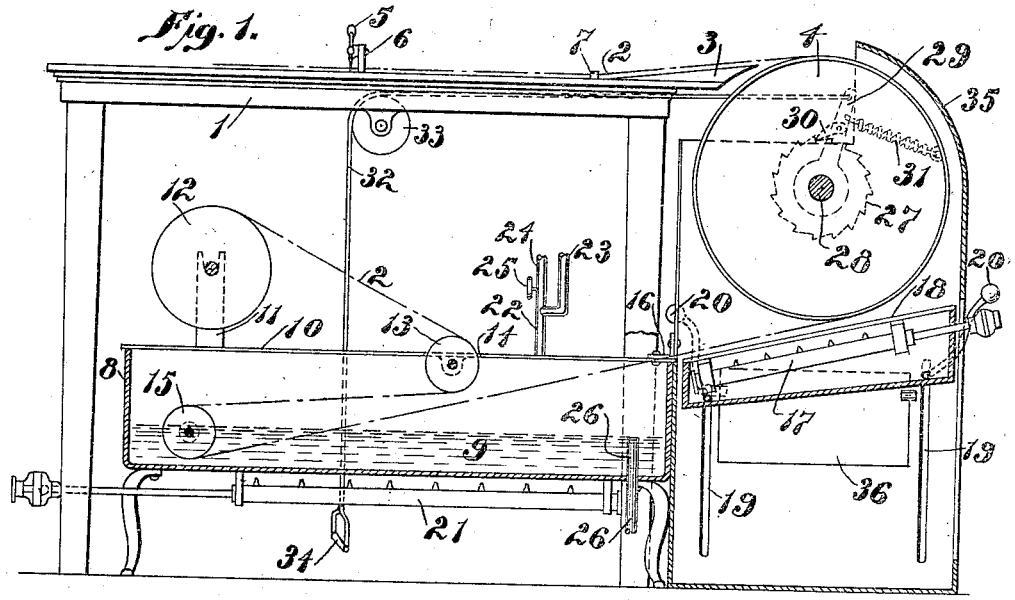
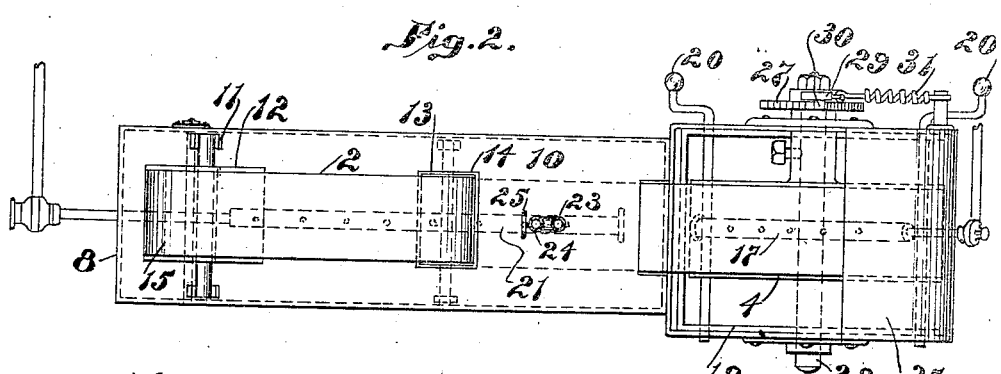
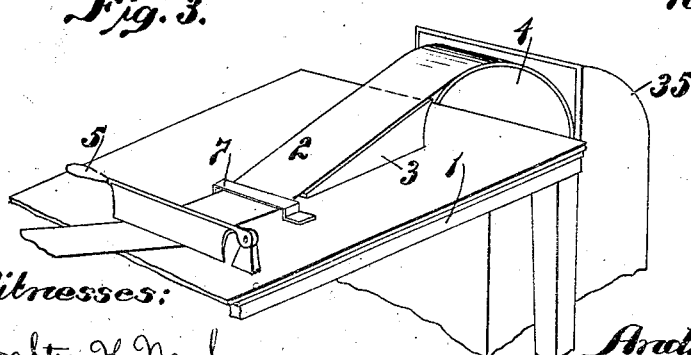
Witnesses:
Walter H. Naylor
M. A. Jones.
Inventor:
Andrew Thoma,
by Geo. H. Maxwell
Attorney.

UNITED STATES PATENT OFFICE.

ANDREW THOMA, OF CAMBRIDGE, MASSACHUSETTS, ASSIGNOR, BY MESNE ASSIGNMENTS, TO CLIFTON MANUFACTURING COMPANY, OF BOSTON, MASSACHUSETTS, A CORPORATION OF NEW JERSEY.

MACHINE FOR TREATING COATED CANVAS.

No. 921,635.

Specification of Letters Patent.

Patented May 11, 1909.

Application filed May 15, 1905. Serial No. 260,559.

*To all whom it may concern:*

Be it known that I, ANDREW THOMA, a citizen of the United States, residing at Cambridge, in the county of Suffolk and State of Massachusetts, have invented an Improvement in Machines for Treating Coated Canvas, of which the following description, in connection with the accompanying drawings, is a specification, like numerals on the drawings representing like parts.

In the United States patent granted to me February 13, 1906, No. 812,383, upon an application filed March 13, 1905, I claimed a method of making innersoles and the like which contemplated, specifically, applying to a piece of duck or canvas or other fabric a basic coating consisting of a compound of 20% of resinous residuum of petroleum and 80% of gum chicle, or pontianac, or tuno, or almeidina, or any vegetable gum of similar nature, and then one or more coatings of a compound consisting of 5% of said resinous residuum of petroleum, 20% of said gum chicle or other enumerated gums, and 75% of resinous gutta percha; passing the coated duck through a bath of hot water to soften and render the same pliable, then passing the duck through an oven or heating device for imparting a stickiness to the coating, thereby bringing the duck into an adhesive condition ready for application to a piece of leather in the manufacture of insoles, such, for example, as Gem insoles, which are illustrated with substantial accuracy in the patent to Cole No. 575,460.

The present invention consists of a machine for carrying out the latter part of that method, to-wit, a machine for treating properly coated duck or canvas to bring it into condition for application to pieces of leather to form innersoles.

In the accompanying drawings, Figure 1 is a longitudinal, sectional view of a preferred form of mechanism; Fig. 2 is a top plan view thereof; Fig. 3 is a fragmentary perspective view.

The illustrated embodiment of my invention is described as follows:—

The operator works on a table 1, the fabric strip 2 being delivered down an incline 3 from a feed wheel 4 where it may be cut off by the operator with a pair of scissors or by a knife 5 pivoted at 6, the strip being guided to said knife by a guide 7. The pieces which are cut off from the strip are first applied to the innersole roughly by hand and then finally by a special pounding machine, known as the Gem insole machine, but as these features do not form any part of my present invention, they are not herein shown. Beneath the table 1, I provide a tank 8 for hot water 9 which is kept tightly closed by a cover 10 on which I have shown supports 11 for removably receiving a roll 12 of the strip of canvas 2. Said strip 2 is led over a guide roll 13 mounted in the cover 10, down through a slit 14 into the tank, and around a second guide roll 15 whence it passes through more or less of the water and out through a delivery opening 16 to the feed wheel 4. Immediately below said wheel 4, and near the end of the tank 8 from which the strip emerges, I provide a gas heater 17, located beneath a shield 18, for applying an intense heat directly to the coated side of the strip just as the latter leaves the water bath. This gas heater 17 is mounted in slide ways 19, and has handles 20 so that it may be quickly lowered and thereby moved away from the wheel whenever it is desired temporarily to interrupt the use of the machine or whenever for any reason the heat must be removed from the canvas for a few moments. Beneath the tank is a gas heater 21 for keeping the water hot. A continuous supply of hot water may be furnished through a pipe 22 leading from a source of water supply 23 connected by a pipe 24 with a steam supply, said pipe having a cock 25 so that any desired amount of steam may be admitted to heat the water. An overflow pipe 26 is provided in the tank for limiting the height of the water.

The feed wheel 4 may be turned to feed forward the strip of canvas 2 by the pull exerted by the operator on the strip. In order to prevent the coating from adhering to his hand, he may coat his thumb and finger with vaseline.

Mechanism is provided for rotating the feed wheel to feed the strip of canvas out onto the table. A ratchet wheel 27 is secured on the shaft 28 of the feed wheel 4, and an arm 29 loosely mounted on said shaft 28 carries a pawl 30 which engages the ratchet wheel. The forward movements of the pawl advance the feed wheel step by step to feed the strip out onto the table. The pawl arm 29 is retracted by a spring 31 and advanced by a cord or chain 32 running over a pulley 33 provided at its end with a stirrup 34 so that the operator may advance the strip by depressing the stirrup and have his hands free to work with.

The roll 12 of canvas is wound with its coated side inward. The roll is mounted on the tank, as shown, and the strip is passed through the machine, being thoroughly moistened by the water, by which the canvas is rendered pliable and put into condition to be shaped and formed to the configuration of the innersole body, and then while still moist the coated side thereof is rendered sticky or tacky by the application of the heat supplied by the gas heater 17, the sticky side being then on the outside of the feed wheel 4, by which it is carried to the table ready to receive the innersole and to be cut off in suitable lengths by the cutting apparatus 5. If the operator is obliged to leave the machine a while, he may grasp the handles 20 and depress the gas heater (which is connected to the source of gas supply by a rubber tube or other flexible connection), and when he returns he may lift the gas heater, thus bringing it back into heating position, no coating having been spoiled the while. When the roll 12 is used up a new roll is put in place and its end is pinned to the end of the old strip. The work then proceeds as before.

The heater 17 and feed wheel 4 are inclosed by a casing 35. The moisture evaporated from the canvas being retained by the casing in contact therewith, continues the softening of the canvas and the coating. This softening of the coating by the moist heat operates with the dry heat to produce a more lasting stickiness, that is to say, the presence of moisture on and about the coating when it is heated to render it sticky increases the duration of its tacky condition. A door 36 provides for access to the inside of the casing.

In the apparatus described a hot water tank is used for tempering the strip of canvas and dampening its coating, but moist steam may be used in place of hot water if desired. More or less heat will be required to soften and render the coating sticky as the duration of the exposure of the strip to the heat is shorter or longer, and as the nature of the compound with which the strip is coated varies. With a coating of the compound hereinbefore described, and with the comparatively short time of exposure of the strip to the heat in the machine illustrated in the drawings, the heat to which the coating is exposed should be intense, but if an apparatus provided for a longer exposure to the heat, a lower temperature would suffice. The invention is not limited to any particular form of heating apparatus, as any heating contrivance adapted to apply the proper amount of heat to render the coating sticky and tacky is within the purview of the invention.

My invention is susceptible of embodiment in other constructions, so therefore, except where the claims are limited by their terms they are to be understood as directed to cover the invention in a broad and generic manner.

I claim—

1. A machine for treating gutta percha coated canvas and the like to render the canvas flexible and the coating sticky, having, in combination, a moistening device for tempering the canvas and dampening the coating, a heating contrivance for heating the coating to render it sticky, and supports or guides leading the canvas first to the moistening device and then to the heating contrivance.

2. In apparatus of the class described, means to support the coated fabric and cause it to travel longitudinally, means to apply moisture to said fabric, and means to subject simultaneously corresponding portions of fabric to dry-heat to soften and render tacky the coating thereof.

3. A machine for applying innersole reinforcing fabric, comprising a moistening tank, means for supporting a roll of cement-coated fabric, means for passing said fabric through said tank, means for applying moisture to the opposite sides of said fabric for thoroughly moistening both the coated side and the uncoated side, means for applying an intense heat to the moistened coated side of said fabric, and feeding mechanism for engaging solely the uncoated side of said fabric and feeding the same forward.

4. A machine for applying innersole reinforcing fabric comprising a closed moistening tank for containing a moistening fluid, means for supporting a roll of cement-coated fabric, means for applying an intense heat to the moistened fabric, a work table, and feeding mechanism for engaging the uncoated side only of said fabric and delivering the same to said table, said machine being constructed to maintain the coated side of said fabric untouched during its passage from said heating means to said table.

5. A machine for applying innersole reinforcing fabric, comprising a moistening tank, inlet and outlet pipes for maintaining a moistening bath therein, means for supporting a roll of cement-coated fabric, means for passing said fabric through said moistening bath, means for applying an intense heat to said coated fabric, a work table, and means for feeding said fabric from said heating means to said table, said fabric in its passage through said moistening tank and from the latter to said table being engaged solely on its uncoated side.

6. A machine for applying inner sole reinforcing fabric, comprising a moistening tank, means for supporting a roll of cement-coated fabric, means in said tank for thoroughly moistening said fabric, a work table, feeding mechanism for delivering said fabric to said table while still moist, and means for rendering the coated side of said fabric tacky during its progress to said table.

7. A machine for applying innersole reinforcing fabric, comprising means for delivering a continuous web or strip of fabric previously coated on one side only with cement, moisture-applying means for moistening said web, a work table, web-severing means, feeding mechanism for delivering said fabric while still moist with its uncoated side upon said table to be severed, and means for rendering the coated side of said fabric tacky during its progress through the machine to said table.

8. A machine for applying innersole reinforcing fabric, comprising means for delivering a continuous web of fabric previously coated with cement on one side only, moisture-applying means containing water or steam for application to said previously cemented web, feed pipes for supplying said water or steam, means for engaging the uncoated side of said web for movably supporting the web and maintaining its coated side untouched, a table for receiving the web from said engaging means, severing means coöperating therewith, and means out of contact with the coated side of said web for rendering the latter tacky during its progress through the machine to said table.

9. A machine for applying innersole reinforcing fabric, comprising means for delivering a continuous web of fabric previously coated with cement on one side only, moisture-applying means containing water or steam for application to said previously-cemented web, feed pipes for supplying said water or steam, means for applying heat to said web for rendering the coated side thereof tacky in its progress through the machine, and coöperating means combined with the aforesaid mechanism to maintain said coated side undisturbed and deliver the same to be cut in a moist and tacky condition.

10. A machine for applying innersole reinforcing fabric, comprising means for delivering a continuous web of fabric previously coated with cement on one side only, moisture-applying means containing water or steam, a feed drum, and means coöperating therewith for rendering the coated side of said fabric tacky while being fed through the machine.

11. A machine for applying innersole reinforcing fabric, consisting of a moistening tank, means for supporting a roll of coated fabric adjacent thereto, means for delivering said fabric within said tank, means for passing said fabric back and forth in said tank for affording a long extent of travel within the tank, means for maintaining a hot fluid bath within said tank for enveloping said fabric, a work table, feeding mechanism for engaging the uncoated side of said fabric and feeding the same from said tank to said table, and means intermediate said tank and table for applying to the coated side of the fabric an intense local heat.

12. A machine for applying innersole reinforcing fabric, consisting of a moistening tank, means for supporting a roll of fabric, means coöperating with said tank for enveloping a considerable portion of said fabric in the moistening bath of said tank, a work table, feeding mechanism for engaging the uncoated side of said fabric and feeding the same from said tank to said table, means intermediate said tank and table for applying to the coated side of the fabric an intense local heat, and mechanism for separating momentarily at will said heating means and coated fabric.

13. A machine for applying innersole reinforcing fabric, consisting of a moistening tank, means for delivering thereinto a cement-coated strip, means within said tank for applying moisture to the opposite sides of said strip, a work table, feeding mechanism for engaging the uncoated side of said strip and delivering the strip to the table, heating means for applying an intense local heat to the coated side of the fabric, and operating means for operating said feeding mechanism step by step.

14. A machine for applying innersole reinforcing fabric, consisting of a moistening tank, means for delivering thereinto a cement-coated strip, means within said tank for applying moisture to the opposite sides of said strip, a work table, containing means for cutting off portions of said strip as the latter is fed along, feeding mechanism for engaging the uncoated side of said strip and delivering the strip to the table, and heating means for applying an intense local heat to the coated side of the fabric.

In testimony whereof, I have signed my name to this specification, in the presence of two subscribing witnesses.

ANDREW THOMA.

Witnesses:
GEO. H. MAXWELL,
M. A. JONES.